(12) United States Patent
Bernett

(10) Patent No.: US 8,396,023 B2
(45) Date of Patent: Mar. 12, 2013

(54) FREQUENCY-DOMAIN INTERLACING IN A MULTI-CARRIER FREQUENCY-HOPPING RADIO

(75) Inventor: William Bernett, Melbourne, FL (US)

(73) Assignee: Investors Life Insurance Corporation, Greenwich, CT (US)

( * ) Notice: Subject to any disclaimer, the term of this patent is extended or adjusted under 35 U.S.C. 154(b) by 295 days.

(21) Appl. No.: 12/172,154

(22) Filed: Jul. 11, 2008

(65) Prior Publication Data

US 2009/0010309 A1 Jan. 8, 2009

Related U.S. Application Data

(63) Continuation-in-part of application No. 11/532,306, filed on Sep. 15, 2006, and a continuation-in-part of application No. 10/730,753, filed on Dec. 8, 2003, now Pat. No. 7,457,295.

(60) Provisional application No. 60/784,105, filed on Mar. 20, 2006.

(51) Int. Cl.
*H04B 7/212* (2006.01)

(52) U.S. Cl. .......... 370/322; 370/252; 370/445
(58) Field of Classification Search .......... 370/252, 370/322, 445
See application file for complete search history.

(56) References Cited

U.S. PATENT DOCUMENTS

| 5,974,081 | A | * | 10/1999 | Rosas et al. | 375/133 |
| 6,009,332 | A | * | 12/1999 | Haartsen | 455/450 |
| 7,177,294 | B2 | * | 2/2007 | Chen et al. | 370/338 |
| 2007/0008875 | A1 | * | 1/2007 | Gerhardt et al. | 370/204 |
| 2008/0130559 | A1 | * | 6/2008 | Pi | 370/329 |
| 2008/0298450 | A1 | * | 12/2008 | Zhang et al. | 375/227 |
| 2009/0257396 | A1 | * | 10/2009 | Eliezer et al. | 370/330 |
| 2011/0007653 | A1 | * | 1/2011 | Casaccia et al. | 370/252 |

* cited by examiner

*Primary Examiner* — Jason Mattis
(74) *Attorney, Agent, or Firm* — Feldman Gale, P.A.; Michael C. Cesarano

(57) ABSTRACT

A 'smart' sub-channel hopping control mechanism executes one or more sub-channel selection discriminators to enable the communications controller of a spectral reuse transceiver to delineate on which of a plurality sub-channels the spectral reuse transceiver may transmit, so as to substantially improve FEC performance.

1 Claim, 2 Drawing Sheets

FREQUENCY-DOMAIN INTERLACING IN A MULTI-CARRIER FREQUENCY-HOPPING RADIO

CROSS-REFERENCE TO RELATED APPLICATIONS

The present application is a continuation-in-part of U.S. application Ser. No. 11/532,306, filed Sep. 15, 2006 (hereinafter referred to as the '306 application) which claims benefit under 35 USC Section 119(e) of U.S. application No. 60/784,105 and is also a continuation-in-part of U.S. application Ser. No. 10/730,753, filed Dec. 8, 2003, now U.S. Pat. No. 7,457,295 (hereinafter referred to as the '753 application), which claims benefit under 35 USC Section 119(e) of U.S. Patent Application Ser. No. 60/784,105, filed Mar. 20, 2006. The disclosures of each of these applications is herein incorporated by reference in its entirety.

FIELD OF THE INVENTION

The present invention relates in general to communication systems and subsystems thereof, and is particularly directed to an 'improved' sub-channel hopping control mechanism that may be employed by the communications controller of a spectral reuse in transceiver (transceiver) of a communication system of the type disclosed in the above-identified '753 application, to delineate an order by which ones of a plurality sub-channels (that are potentially available for reuse by a secondary user due to primary channel inactivity) the spectral reuse transceiver may transmit, in a manner that substantially reduces, and optimally minimizes, the likelihood of performance degradation of an FEC ("Forward Error Correction") decoder utilized in said spectral reuse transceiver.

BACKGROUND OF THE INVENTION

As described in the above-identified '753 application, in some radio bands, such as the 217-220 MHz VHF band, as a non-limiting example, governmental licensing agencies (e.g., the Federal Communications Commission (FCC)) customarily grant primary licensees non-exclusive use of the band for a variety of communication services, such as push-to-talk voice transmission. These primary users pay for this licensed use with an expectation that they will not encounter interference by other users. The FCC also allows secondary users to access the same band and the same channels within the band on a 'non-interfering' or secondary basis, whereby a channel may be used by a secondary, non-licensed, user, so long as the primary user is not using that channel.

The FCC and similar agencies in foreign countries are continually looking for ways that allow expanded use of these licensed radio frequency bands, without reducing the quality of service available to the primary users. For secondary users, these bands provide a cost-free opportunity with excellent radio transmission properties for telemetry and other applications. Because secondary users must not interfere with primary users, complaints of interference from a primary user to the FCC may result in its issuing an administrative order requiring that the secondary user move to another portion of the band or leave the band entirely. Such a spectral transition is disruptive to the secondary user's service and can be expensive, especially if site visits, equipment modification, or exchange are required, in order to implement the mandated change. It will be appreciated, therefore, that there has been a need for a mechanism that allows a secondary-user to employ a licensed band on a non-interfering basis and will adapt the radio's frequency usage should new primary users appear. It should be noted that primary users always have priority over secondary users, there is no first-use channel frequency right for secondary users.

Advantageously, the invention described in the above-referenced '753 and '105 applications successfully addresses this need by means of a monitored spectral activity-based link utilization control mechanism. Briefly reviewing this link utilization control mechanism which may be used with a star-configured communication system among other configurations and topologies, such as that depicted in the reduced complexity diagram of FIG. 1, a spectral reuse transceiver installed at a master site 10 communicates with respective spectral reuse transceivers installed at a plurality of remote sites 12. Each spectral reuse transceiver operates with a selectively filtered form of frequency hopping for producing a sub-set of non-interfering radio channels also referenced herein as 'sub-channels'. The network uses a dynamic hopping sequence based on interference measurements. A pseudo-random sequence is used to select hopping channels in the band that are not busy. If, for example, the network is using 20 hopping channels simultaneously to achieve the desired bandwidth, it will select twenty of the available hopping channels out of the available (non-busy) hopping channels and transmit in those hopping channels for a dwell period. It will then select another set of twenty available hopping channels out of the available hopping channels and use those during the next dwell period. This process continues until the continuing spectral analysis, described earlier, detects a change to the list of available hopping channels (new interference or formerly busy or blocked hopping channel becomes available). After that time, new hopping sequences are used in the network, to take into account the change in interference analysis. It should be noted here that other configuration or network topologies may be used consistent with the invention disclosed herein.

Thus the invention may be used with radio links between transceivers in other topologies, such as point-to-point, and individual links in mesh networks, without limitation, consistent herewith.

For this purpose, the master site 10 periodically initiates a clear channel assessment routine; in which the master site and each of the remote sites 12 participate, in order to compile or 'harvest' a list of non-interfering or 'clear' sub-channels such as, by way of example and not limitation, 6.25 KHz wide sub-channels, which may be used by participants of the network for conducting communication sessions that do not ostensibly interfere with any licensed user. By transmitting on only clear sub-channels, a respective site's spectral reuse transceiver is ensured that it will not interfere with any primary user of the band of interest.

Except when it is transmitting a message to the master site, each remote user site sequentially steps through and monitors a current list of clear channels that it has previously obtained from the master site, in accordance with a pseudo-random (PN) hopping sequence that is known a priori by all the users of the network, looking for a message that may be transmitted to it by the master site transceiver. During the preamble period of any message transmitted by the master site, each remote site's transceiver scans all frequency bins within a given spectrum for the presence of energy. Any bin containing energy above a prescribed threshold is marked as a non-clear channel, while the remaining channels are identified as clear channels thus available for reuse.

Whenever a remote site notices a change in its clear channel assessment, it reports this to the master site at the first opportunity. As the master site has received clear channel lists from all the remote sites, it logically combines all of the clear channel lists, to produce a composite clear channel list. This composite clear channel list is stored in the master site's transceiver and is broadcast to all of the remote sites over a prescribed one of the clear channels that is selected in accordance with a PN sequence through which clear channels are selectively used among the users of the network. When the composite clear channel list is received at a respective remote site it is stored in its transceiver.

To ensure that all communications among the users of the network are properly synchronized in terms of a composite clear channel list and the order through which the units traverse, or 'hop' through, the clear channel entries on that list, the master site's transceiver transmits an initialization message on an a priori established clear channel, which each of the remote units monitors. This initialization message contains the clear channel list, an identification of the preamble channel, a PN sequence tap list, and a PN seed that defines the initial channel and hopping sequence for the duration of an upcoming transmit burst. Once a remote site has received an initialization message, that site will transition to normal multiple access mode.

For further details of the architecture and operation of the spectral reuse link control mechanism disclosed in the above-referenced '753 application, the contents of which are hereby incorporated by reference, attention may be directed to that document. They will not be detailed here, in order to focus the present description on the problem of 'FEC degradation', whereby varying and unpredictable atmospheric or other conditions, which can give rise to multipath, and man-made noise cause errors in burst transmissions; and whereby transmissions on formerly clear channels that were recently 'clear' and thereby potentially available for secondary reuse sub-channels are suddenly in use for a sustained period by another primary or secondary 'interferer' and collide with said transceiver's transmissions. Both these and similar events undesirably degrade the performance of the receiving transceiver's FEC circuit.

SUMMARY OF THE INVENTION

In accordance with the present invention, this 'FEC degradation problem' is successfully addressed by equipping the spectral reuse transceiver's communications controller with an 'improved' sub-channel hopping control mechanism, that uses one or more prescribed sub-channel selection filters or discriminators, to control the manner in which it hops among 'clear' or potentially available sub-channels, so as to substantially reduce and optimally minimize the degrading effect of atmospheric and man-made noise and transmission collisions on FEC performance.

A first of these discriminators involves limiting the 'spectral proximity' in frequency of consecutively used sub-channels by alternatively selecting sub-channels from and upper and lower sub-band, so as to lessen the likelihood of 'FEC degradation' whereby atmospheric conditions or interfering signals reduce the chance that the FEC circuits on the receiving end of the transmission can correct errors resulting from the interference. A second of these discriminators involves limiting the 'spectral proximity' in frequency of consecutively used sub-channels by selecting sub-channels for use pseudo-randomly and applying a filter to reject sub-channels that are too close in frequency to the previously used sub-channel, similarly as to lessen the likelihood of 'FEC degradation'.

DETAILED DESCRIPTION

Figure 1:
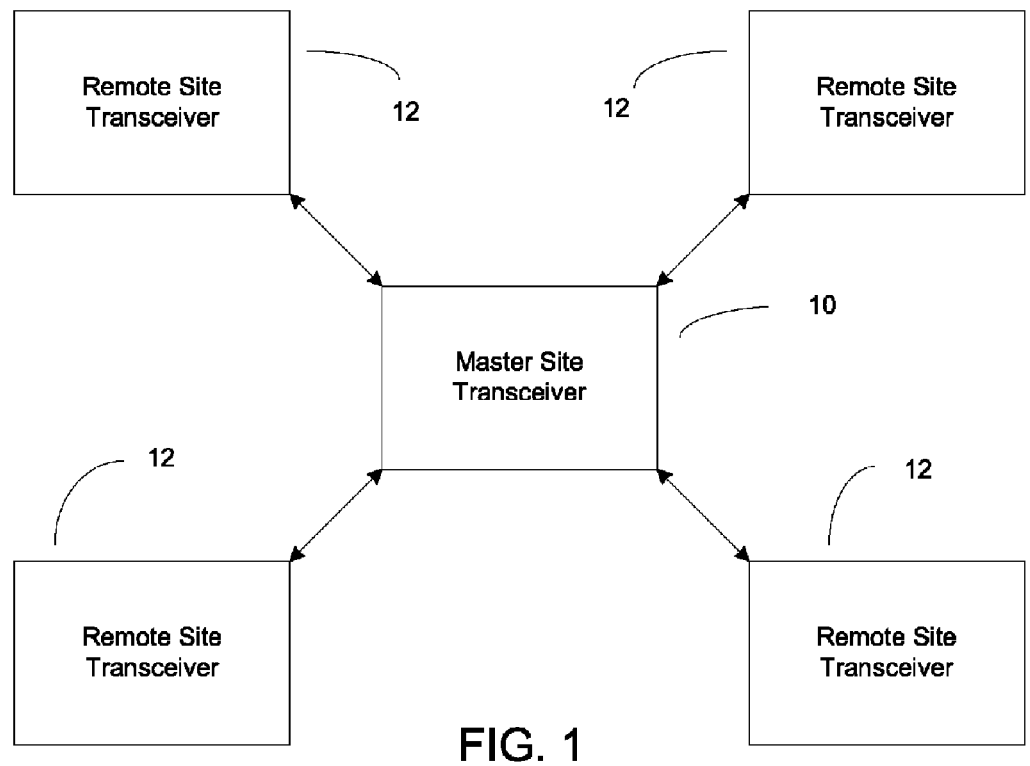
FIG. 1 diagrammatically illustrates the overall architecture of a communication network, respective terminal unit transceiver sites of which employ the spectral reuse transceiver of the invention disclosed in the above-referenced '753 application.

Before describing the details of the 'improved' sub-channel hopping control mechanism of the present invention, it should be observed that the invention essentially involves an augmentation of the sub-channel hopping control mechanism executed by the communications control processor of the spectral reuse transceiver of the type disclosed in the above-referenced '753 application, that involves the execution of one or more prescribed discriminators or sub-channel selection filters, so as to effectively improve the performance of the FEC circuit on the receiving end of a transceiver link. As will be described, these filter functions are readily implemented by appropriately setting the configuration parameters used by the communications controller of the transceiver disclosed in the '753 application to control the operation of the transceiver. The architecture of the transceiver of the '753 application may remain unchanged. As a consequence, the present invention has been illustrated in the drawings by readily understandable diagrammatic illustrations, which include a generalized network architecture diagram, and a channel sub-division diagram, that show details that are pertinent to the invention, so as not to obscure the disclosure with details which will be readily apparent to one skilled in the art having the benefit of the description herein.

As pointed out briefly above, one objective of each of the discriminators of the augmentation to the sub-channel hopping control mechanism in accordance with the invention is to improve the performance of the FEC circuit on the receiving end of a transceiver link. Non-limiting, but preferred, examples of such discriminators include: 1—dividing the available channels into two or more logical subsets and alternating channel selections from these subsets; and 2—using a random selector, but rejecting, not hopping to, a sub-channel within a set distance (in channels or kHz, for example) of the previous transmission. The operation and effect of each of these discriminators will be discussed individually below.

FIG. 1, as described earlier, graphically illustrates spectral reuse transceiver, of the type described in the above-referenced '753 application, installed at a master site 10 communicates with respective spectral reuse transceivers installed at a plurality of remote sites 12. Each spectral reuse transceiver operates with a selectively filtered form of frequency hopping for producing a sub-set of non-interfering radio channels or sub-channels.

Figure 2:
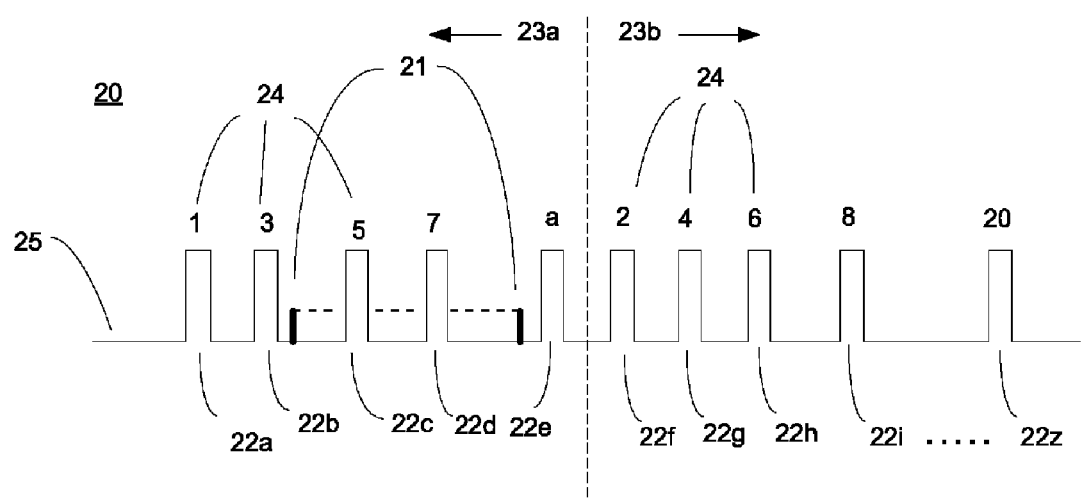
FIG. 2 graphically illustrates the division of usable channels into logical upper and lower halves, an example hopping sequence through the usable channels according to the present invention, and the relationship between an interfering signal and a set of usable channels.

To facilitate an understanding of the functionality and effect of the first discriminator identified above—division of available channels—attention may be directed to FIG. 2, which graphically illustrates the relationship between an interfering signal and a hopping sequence in a spectral reuse transceiver of the type described in the above-referenced '753 application. In graph 20 of FIG. 2, a frequency band 25 comprises unavailable channels (not shown) and available channels 22a-z, where the unavailable channels are in use by other networks, as detected by the spectral reuse radio in the above-referenced '753 application. The available channels 22a-z form a 'logical band' of 'sub-channels' that was determined by the said cognitive radio not to be in use by other radios just prior to the transmission represented in FIG. 2 and may be used for one or more transmission bursts, each burst comprising one or more of available channels 22a-z. In the scenario of FIG. 2, however, a new interferer's signal 21 (dashed line) appears which happens to span sub-channels 22-c and 22-d. As described in the above-referenced '753 application, the transceiver will avoid this spectral area of interference signal 21 soon after, but since the interference signal 21 appeared at the instant the transceiver began its multi-carrier burst, sub-channels 22c and 22d will collide with interference signal 21. If the transceiver transmitted its symbols using the available channels 22 a-z in order of lowest to highest frequency (or channel number) in the logical band, shown graphically left to right in FIG. 2, then the logically adjacent symbols transmitted on sub-channels 22c and 22d would both collide with interference signal 21; in such a case, as is well-known in the art, the performance of the receiving FEC decoder will be degraded since FEC decoders have less chance of recovering from errors when logically adjacent symbols are lost. Similarly, localized atmospheric conditions can have localized detrimental effects similar to interference signal 21; that is, said localized atmospheric conditions can cause errors in the transceiver's transmission, thereby similarly degrading FEC performance.

As noted earlier, prior art solutions include separating logically adjacent symbols in time. According to one embodiment of the present invention, logically adjacent symbols are separated in frequency, as illustrated in FIG. 2. Radio band 25 is divided into two logical halves, lower logical sub-band 23a and upper logical sub-band 23b with, in this non-limiting example, sub-channels 22a-z distributed approximately evenly over logical sub-bands 23a and 23b. According to the present invention, the transceiver selects sub-channels 22a-z during a burst, alternating between logical sub-bands 22a and 22b, as indicated by selection order 24 (above each sub-channel 24a-z in the figure). In the present example, the transceiver would use sub-channels 22a-j in the following order: 22a, 22f, 22b, 22g, 22c, 22h 22d, 22i . . . . By using this order, it is seen that the symbols transmitted in sub-channels 22c and 22d are not logically adjacent. In the present example, the logically adjacent symbols that would have been transmitted in sub-channels 22c and 22d, the third and fourth symbols, are now transmitted in 22b and 22g, respectively.

It is readily apparent to one skilled in the art that many alternate orderings can by used rather than the sequence in the present example. For example, band 25 could be broken into three, four or more logical sub-bands 23, or the order of selection from the logical sub-bands 23 could differ in various ways. For example, the discriminator could guarantee that no three or more logically adjacent symbols are transmitted near in frequency by a parameterized amount. These and other similar techniques are encompassed by the present invention. For example, in another embodiment of the present invention, the transceiver selects the next candidate sub-channel 22 to be used pseudo-randomly, for example, through the use of a PN sequencer, wherein the discriminator discards any candidate sub-channel 22 if it is too close in frequency to the previously transmitted symbol by some parameterized amount, requiring the selection of a new candidate next sub-channel 22

A relatively simple filtering mechanism, shown in the flowchart of FIG. 3, described below, involves incrementally 'sweeping' the transmission frequency—for example, from the lowest available sub-channel to the highest available sub-channel (or conversely from the highest available sub-channel to the lowest available sub-channel), but alternating the selections from a lower logical sub-band and an upper logical sub-band, which ensures that no logically adjacent symbols will be transmitted in logically adjacent sub-channels for two immediately successive hops.

A third discriminator involves rejecting an immediately 'logically adjacent' hopped sub-channel, namely, a sub-channel that is spectrally mutually contiguous with (one sub-channel higher or one sub-channel lower than) the previously transmitted sub-channel. Similar to the effect of the first discriminator, not hopping to a most recently transmitted sub-channel in accordance with the second discriminator, or not hopping to a logically adjacent sub-channel in accordance with the third discriminator prevents logically adjacent symbols to be transmitted in logically adjacent sub-channels, thereby decreasing FEC performance of the receiving transceiver.

As in the case of the second discriminator, rejecting an immediately 'spectrally adjacent' sub-channel may be readily accomplished by incrementally sweeping the transmission logical band and skipping every nth sub-channel, and repeating as necessary, using the next value of n. For example, with n having a value of two, the spectral reuse transceiver may use even-numbered sub-channels and then odd-numbered sub-channels, repeating as necessary. Depending on the implementation chosen, more-random selections may be used.

Figure 3:
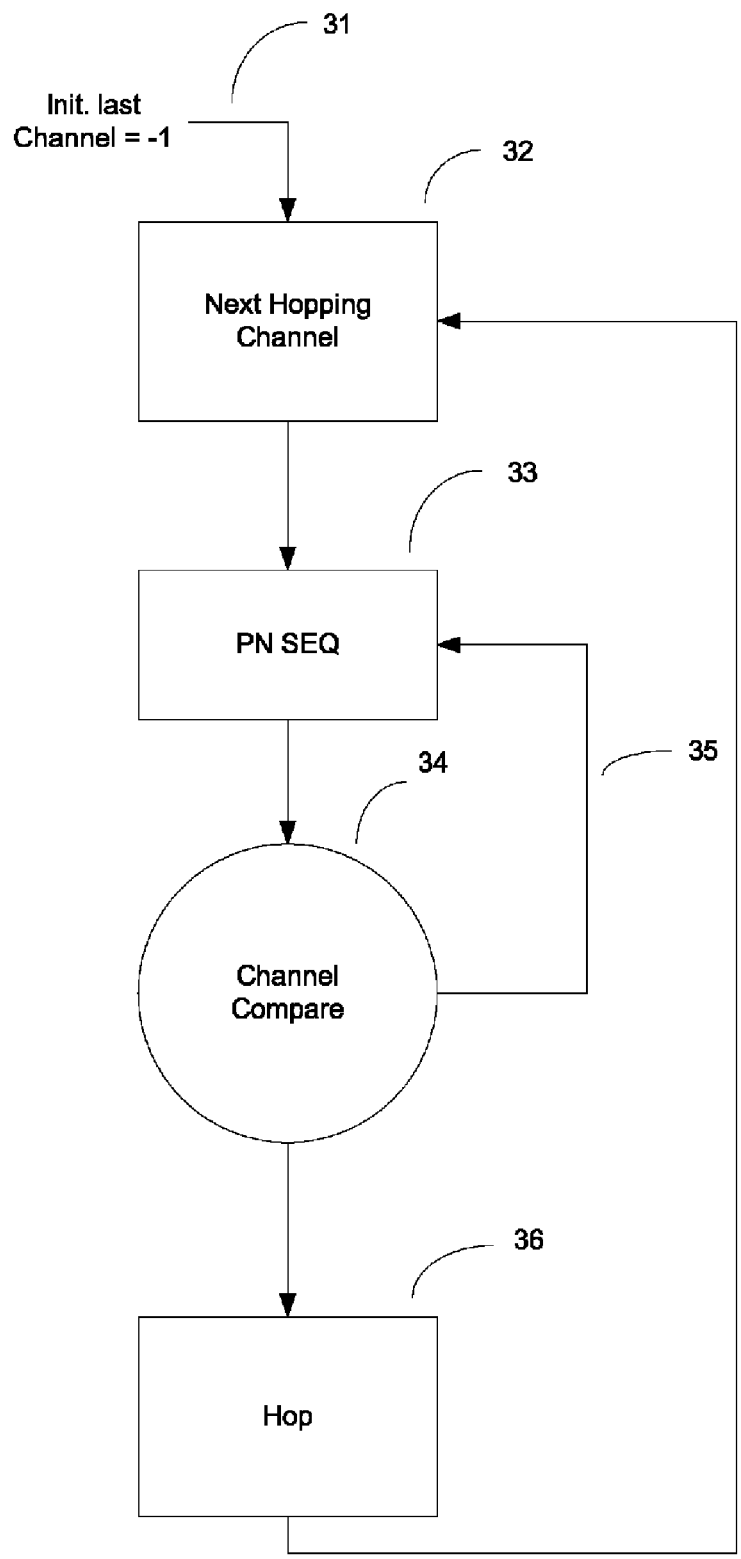
FIG. 3 is a flowchart of a routine for implementing a sub-channel discriminator to select a hopping sequence according to an embodiment of the present invention.

More particularly, as shown in FIG. 3, a filter routine that is effective to implement the second and third discriminator functions, described above, has an initialized entry point 31, wherein the designation of the last hopped sub-channel is set at an invalid value (e.g., −1), so that the first selected hopped sub-channel will always be valid and not filtered out. A next hopping sub-channel step 32 then causes the next hopped sub-channel to be selected, by invoking the operation of a pseudo-random number sequence generator (PNSEQ) step 33. When invoked, PNSEQ step 33 outputs a pseudo-randomly based number that specifies one of the available hopped sub-channels as a 'candidate' hopped channel.

This candidate hopped sub-channel is then coupled to a channel compare step 34, which determines whether the candidate hopped sub-channel, as specified by the PNSEQ step 33, is a minimum 'logical distance', number of logical channels, from the last valid hopped sub-channel. If the candidate hopped channel is less than the minimum logical distance from the last valid hopped logical channel, the channel compare step 34 provides an output 35 to the PNSEQ step 33 to select a new candidate hopped sub-channel. Otherwise, the channel compare step 34 supplies the candidate hopped sub-channel to a hop step 36, which outputs the candidate hopped sub-channel to the frequency hopping control mechanism of the transceiver, causing the transceiver to be tuned to that sub-channel. It should be noted that although selection of the next candidate hopped sub-channel in the routine of FIG. 3 is pseudo-randomly based, as an equivalent alternative, it may be non-randomly based, e.g., it may be based on a sequential sweeping through alternating logical sub-bands as described above, or every $n^{th}$ hopped sub-channel.

As interfering traffic increases, the number of available sub-channels will decrease and, at some point, the distribution filter may be unable to find any candidate sub-channels that satisfy the discriminator function. In this case, the quality of service will be reduced, as a result of complying with an interference-avoidance policy, which is a filter configuration parameter, such as flow-controlling lower-priority radio traffic or flow-controlling all traffic in the network. If the policy permits, the frequency-hopping sequences may be repeated, in which case the FEC performance may decrease.

As will be appreciated from the foregoing description, the likelihood of improving FEC performance in frequency-hopping transceiver as a result of transmitting of 'clear' sub-channels employed in a spectral reuse communication system of the type disclosed in the above-referenced '753 application is substantially increased, in accordance with the present invention, by means of a 'smart' hopping control mechanism comprised of one or more or sub-channel selection prescribed discriminators or filters, that enables a transmitting spectral reuse transceiver to substantially reduce the effect of atmospheric conditions and interfering signals, as the spectral reuse transceiver sequentially hops to and transmits on potentially available sub-channels. Optimally, this serves to improve the performance of FEC decoders in the receiving transceiver.

While we have shown and described several embodiments in accordance with the present invention, it is to be understood that the same is not limited thereto but is susceptible to numerous changes and modifications as known to a person skilled in the art. The invention disclosed herein is not intended to be limited to the details shown and described herein, but is intended to cover all such changes and modifications as are obvious to one of ordinary skill in the art. By way of example only, the embodiments herein described FEC performance improvement for the spectral reuse transceiver described in the above-identified '753 application; however, other spectral reuse transceivers and, in general, frequency-hopping transceivers with fixed hopping sequences can be modified to manage their hopping sequences in the manner described herein, thereby employing the FEC performance improvement of the present invention. For example, a frequency-hopping transceiver which normally has a fixed hopping sequence of sub-channels in the band (which may or may not be 'clear') can modify its fixed hopping sequence so that logically adjacent symbols are not in adjacent sub-channels. Similarly, while certain embodiments of the transceivers described in the above-identified '753 application operate in a star network this should not be construed as a limitation in either this application or the '753. Radio links between transceivers in other topologies, such as point-to-point, and individual links in mesh networks, as examples, can employ the FEC performance improvement of the present invention.

I claim:

1. A method of conducting radio frequency (RF) communications between transceivers of a communication network by transmitting on selected sub-channels contained within primary user channels of a prescribed RF communication band, said method comprising the steps of:
    (a) monitoring said prescribed RF communication band for the presence of communication activity on said sub-channels;
    (b) identifying sub-channels, which exhibit energy less than a prescribed value, as effectively clear sub-channels that are potentially available for use by said transceivers;
    (c) communicating said identified sub-channels to all said transceivers on said network;
    (d) selecting subsets of sub-channels comprising said identified sub-channels;
    (e) causing said transceivers to synchronously hop among and transmit in bursts on said selected subsets of identified sub-channels whereby said transceivers are configured to use the same subset of identified sub-channels simultaneously, and logically adjacent symbols are simultaneously transmitted on sub-channels that are spectrally separated by at least one other clear sub-channel.

* * * * *